United States Patent [19]

Sakou et al.

[11] Patent Number: 4,491,962

[45] Date of Patent: Jan. 1, 1985

[54] METHOD OF DETERMINING AN OPTIMUM THRESHOLD FOR OBTAINING BINARY IMAGE SIGNAL FOR USE IN A PATTERN RECOGNITION SYSTEM

[75] Inventors: Hiroshi Sakou; Seiji Kashioka, both of Hachioji, Japan

[73] Assignee: Hitachi, Ltd., Tokyo, Japan

[21] Appl. No.: 361,479

[22] Filed: Mar. 23, 1982

[30] Foreign Application Priority Data

Mar. 25, 1981 [JP] Japan .................. 56-42316

[51] Int. Cl.³ .................. G06K 9/00; G06K 9/38
[52] U.S. Cl. .................. 382/50; 382/8
[58] Field of Search ........ 382/8, 48, 50, 52, 53; 307/358; 328/116

[56] References Cited

U.S. PATENT DOCUMENTS

| | | | |
|---|---|---|---|
| 3,263,216 | 3/1964 | Andrews | 382/38 |
| 3,676,847 | 7/1972 | Partin | 382/50 |
| 4,003,021 | 1/1977 | Sasaki et al. | 382/53 |
| 4,064,484 | 12/1977 | Mese et al. | 382/53 |
| 4,109,211 | 8/1978 | Mese et al. | 328/116 |
| 4,196,454 | 4/1980 | Warren | 382/52 |
| 4,290,049 | 9/1981 | Sternberg et al. | 382/53 |
| 4,334,241 | 6/1982 | Kashioka et al. | 382/8 |

FOREIGN PATENT DOCUMENTS 2908483 10/1980 Fed. Rep. of Germany .

Primary Examiner—Michael A. Masinick
Assistant Examiner—Michael D. Parker
Attorney, Agent, or Firm—Antonelli, Terry & Wands

[57] ABSTRACT

A method of determining an optimum threshold for obtaining a binary image signal for use in a pattern recognition system is disclosed in which a pattern of a predetermined shape which exists at one or a plurality of positions on a surface of an object to be imaged is previously stored as a reference pattern. A threshold for obtaining a binary signal is changed stepwise. A video signal is converted into the binary signal on the basis of each value of threshold to obtain a binary image. A plurality of partial patterns which are different in position on the binary image to each other, are successively cut out of the binary image to be compared with the reference pattern. The overall degree of coincidence between the plural partial patterns and the reference pattern is calculated, and a value of threshold at which the overall degree of coincidence is highest, is selected from various values of threshold.

15 Claims, 20 Drawing Figures

METHOD OF DETERMINING AN OPTIMUM THRESHOLD FOR OBTAINING BINARY IMAGE SIGNAL FOR USE IN A PATTERN RECOGNITION SYSTEM

The present invention relates to a method of determining a threshold for converting a multilevel signal into a binary signal, and more particularly to a method of determining a threshold suited to convert a video signal into a binary signal in the case where partial patterns cut out of an image are successively compared with a reference pattern to recognize the shape and position of a specified pattern contained in the image.

In pattern recognition systems, a video signal provided by such an imaging device as a television camera is processed so as to successively produce two-dimensional partial patterns each corresponding to a limited portion of an image, and the partial patterns thus produced are successively compared with a reference pattern to detect the presence or absence and the position of a partial pattern having the same characteristic as the reference pattern. Such pattern recognition systems are widely used in various kinds of automatic apparatuses. For example, a pattern recognition system is used to discriminate between parts and to recognize the position of a part in a process for automatically assembling semiconductor parts.

In the above-mentioned pattern recognition systems, the reference pattern is prepared (or stored) in such a manner that picture elements corresponding to a characteristic part included in an object to be imaged and having a predetermined shape are placed in a binary state, namely, the state "1" or "0". On the other hand, a video signal, which is provided sequentially by an imaging device in accordance with a scanning operation on an image plane of the imaging device, is converted into a binary signal on the basis of a predetermined threshold at a time interval corresponding to one picture element and thereafter supplied to a cut-out circuit for sequentially cutting out partial patterns from the image. A plurality of partial patterns, each of which is equal in the number of picture elements to the reference pattern, are successively provided by the cut-out circuit and the state of each picture element in each partial pattern is compared with the state of corresponding picture elements in the reference pattern by a comparing circuit. Accordingly, the degree of coincidence between a partial pattern and the reference pattern can be judged by the number of those picture elements in the partial pattern which have the same states as corresponding picture elements in the reference pattern. Further, it can be detected that the same pattern as the reference pattern exists at a position on the image where a partial pattern having a high degree of coincidence with the reference pattern is cut out of an image.

In this case, a binary value of each of picture elements which exist in the neighborhood of the boundary between light area and dark area on a partial pattern, is readily varied depending on a threshold for converting the video signal into the binary signal. When the threshold deviates from an optimum value, a partial pattern which should be the same as the reference pattern, shows a low degree of coincidence similar to that of partial patterns which have characteristics other than the reference pattern. Further, in the case where a three-dimensional pattern, for example, a metallic wiring or bonding pad formed on a surface of a semiconductor chip is to be recognized, the state of each of picture elements existing in the neighborhood of the boundary between light area and dark area of a partial pattern is much more affected by the deviation of the threshold level for obtaining the binary signal, since light is reflected irregularly from a peripheral portion of the three-dimensional pattern.

FIG. 1A shows an image of an object to be recognized, and the image contains a rectangular bonding pad 1 against a dark background. A solid line I of FIG. 1B shows the level of a video signal obtained along a line x passing the center of the bonding pad 1. FIGS. 2A to 2C show partial patterns obtained when a video signal from a portion surrounded by a broken line 2 in FIG. 1A is converted into a binary signal on the basis of three values $T_H$, $T_M$ and $T_L$ of threshold. A zigzag pattern appearing at the boundary between light and dark areas in each of these partial patterns is caused by the above-mentioned irregular refection of light. When a pattern shown in FIG. 3 is prepared as the reference pattern, the partial pattern shown in FIG. 2B shows the highest degree of coincidence with the reference pattern among the partial patterns shown in FIGS. 2A to 2C, and such a relation between the threshold and the degree of coincidence as indicated by a curve I in FIG. 4 is obtained. Further, the level of the video signal varies depending on the light source for illuminating a field of view of an imaging device or depending on a change in characteristic of the imaging device. When the level of video signal is lowered, for example, as indicated by a broken line II in FIG. 1B, the peak position in the relation between the threshold and the degree of coincidence is shifted to the $T_L$ side, as indicated by a broken line II in FIG. 4. When the threshold for obtaining the binary signal deviates from an optimum value the degree of coincidence between the reference pattern and a true partial pattern is lowered. Therefore, the detection of a target object may result in failure, and an accuracy, with which the position of the target object is detected, is lowered.

An object of the present invention is to provide a method of setting the threshold for converting a video signal into a binary signal to an optimum value for pattern recognition.

According to the present invention, a pattern of a predetermined shape which exists at one or plural positions on a surface of an object to be imaged, is previously stored as a reference pattern, a threshold for obtaining a binary signal is changed stepwise, a video signal is converted into the binary signal on the basis of each value of threshold to obtain a binary image, a plurality of partial patterns which are different in position on the binary image from each other, are successively cut out of the binary image to be compared with the reference pattern, the overall degree of coincidence between the plural partial patterns and the reference pattern is calculated, and a value of threshold at which the overall degree of coincidence is highest, is selected from various values of threshold. The overall degree of coincidence indicates how a plurality of partial patterns which are contained in a binary image obtained on the basis of a value of threshold, are coincident with the reference pattern on the whole.

The present invention will be apparent from the following description taken in conjunction with the accompanying drawings, in which.

Figure 1A:
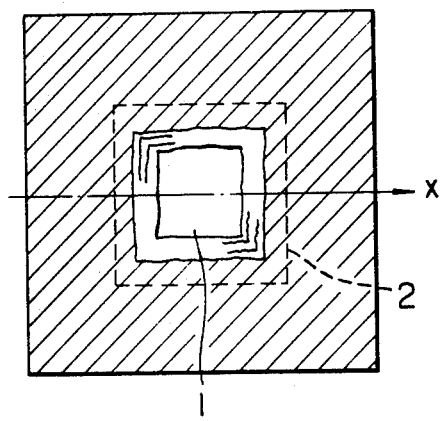
FIG. 1A shows an image of an object.
Figure 1B:
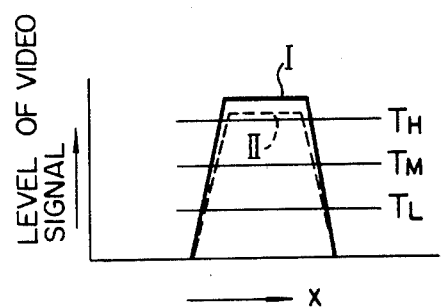
FIG. 1B shows levels of a video signal obtained from a portion of the image shown in FIG. 1A.
Figure 2A:
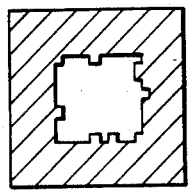
FIGS. 2A to 2C show binary images obtained by processing the image shown in FIG. 1A on the basis of different values of threshold.
Figure 2B:
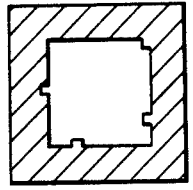
Figure 2C:
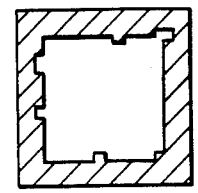
Figure 3:
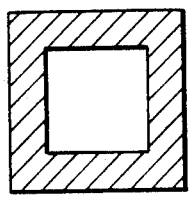
FIG. 3 shows a reference pattern for processing the image shown in FIG. 1A.
Figure 4:
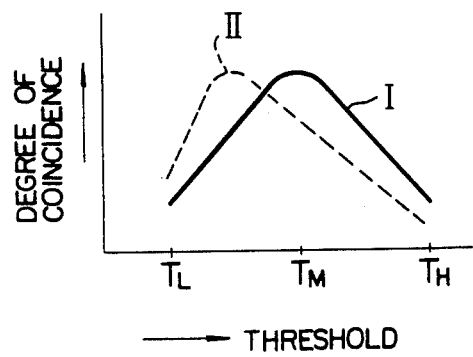
FIG. 4 is a graph showing relations between the threshold for obtaining a binary image signal and the degree of coincidence between the image and the reference pattern.
Figure 5:
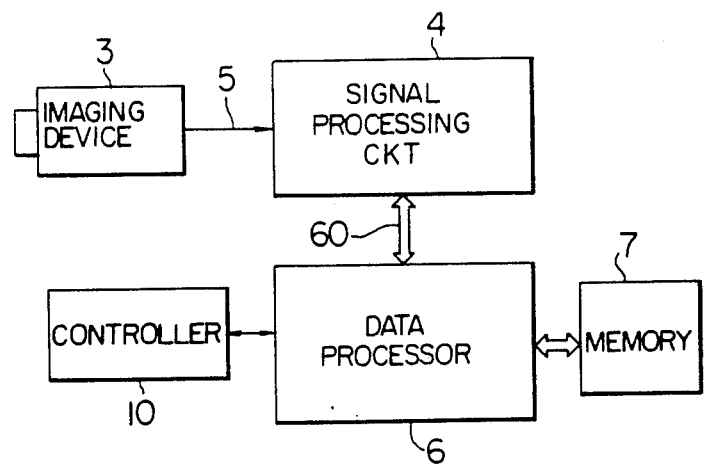
FIG. 5 is a block diagram showing the whole construction of a pattern recognition system, to which the present invention is applied.

FIG. 5 shows the whole construction of a pattern recognition system, to which a method of setting an optimum threshold according to the present invention is applied. In FIG. 5, reference numeral 3 designates an imaging device, 4 a signal processing circuit including a circuit for converting a video signal 5 provided by imaging device 3 into a binary signal, 6 a data processor operated by a program for outputting various control signals 60 including a signal for controlling the threshold used in the above-mentioned signal conversion to control the operation of the signal processing circuit 4, 7 a memory device connected to the data processor 6, and 10 a controller for controlling the operation of the data processor 6.

First, explanation will be made on an example of a pattern recognition technique used in the above-mentioned pattern recognition system. Let us consider the case where a semiconductor pellet is the object of recognition, by way of an example.

Figure 6:
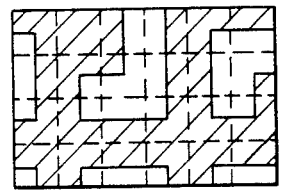
FIG. 6 shows an example of an image at a search area used in the system shown in FIG. 5.
Figure 7A:
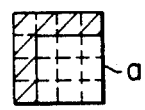
FIGS. 7A to 7D are explanatory views of reference patterns used in the system shown in FIG. 5.
Figure 7B:
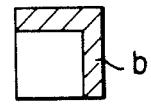
Figure 7C:
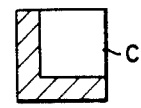
Figure 7D:
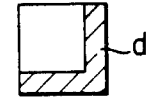

An area for searching a target pattern is provided at a specified position on the image surface of the imaging device beforehand. FIG. 6 shows an example of an image at the search area. Broken lines in FIG. 6 indicate boundaries for dividing the search area into a plurality of sections in each of longitudinal and transverse directions, namely, in each of the directions of X- and Y-axes. Each of the sections is formed of a plurality of picture elements, for example, 13×13 picture elements.

FIGS. 7A to 7D show four kinds of reference patterns a, b, c and d stored in the memory device 7. Each of these reference patterns is smaller in size than the section, and includes, for example, 4×4 picture elements. In the present example, the reference patterns a, b, c and d respectively correspond to four corner portions of a rectangular pattern on the semiconductor pellet.

The signal processing circuit 4 successively cuts partial patterns, each of which is equal in size to the above reference pattern, out of the search area. Each of the partial patterns thus obtained is compared with the reference patterns a to d. Both the kind of a reference pattern which coincides with a partial pattern and the coordinates indicating a position where the coincided partial pattern is cut out, are detected. The coordinates indicating the position of a partial pattern are given by, for example, X- and Y-coordinates of a picture element existing at the lower right corner of 4×4 picture elements making up the partial pattern. The position of each of the partial patterns which exist in the search area shown in FIG. 6 and are the same as the reference patterns, can be detected by the above-mentioned signal processing.

Figure 8:
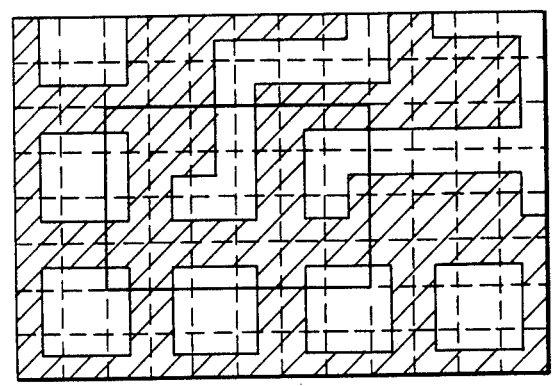
FIG. 8 shows an example of an image of a reference area used in the system shown in FIG. 5.

A predetermined reference area such as shown in FIG. 8 is previously provided on the object, namely, the semiconductor pellet. Coordinate data indicating the positions of partial patterns which exist in the reference area and are coincident with the reference patterns, are stored in the memory device 7. The reference area is made so large that a pattern on the search area can be imaged when the semiconductor pellet is positioned in the field of the view of the imaging device within a predetermined range of error.

Accordingly, in the data processor 6, the coordinate data obtained by the signal processing circuit 4 and the coordinate data which is read out of the memory device 7 and acts as a reference, are collated with each other to find a partial pattern which exists in the search area and satisfies a predetermined positional relation, and the position of the semiconductor pellet appearing in the field of view of the imaging device can be detected by the coordinate data indicating the position of the above-mentioned partial pattern.

Figure 9:
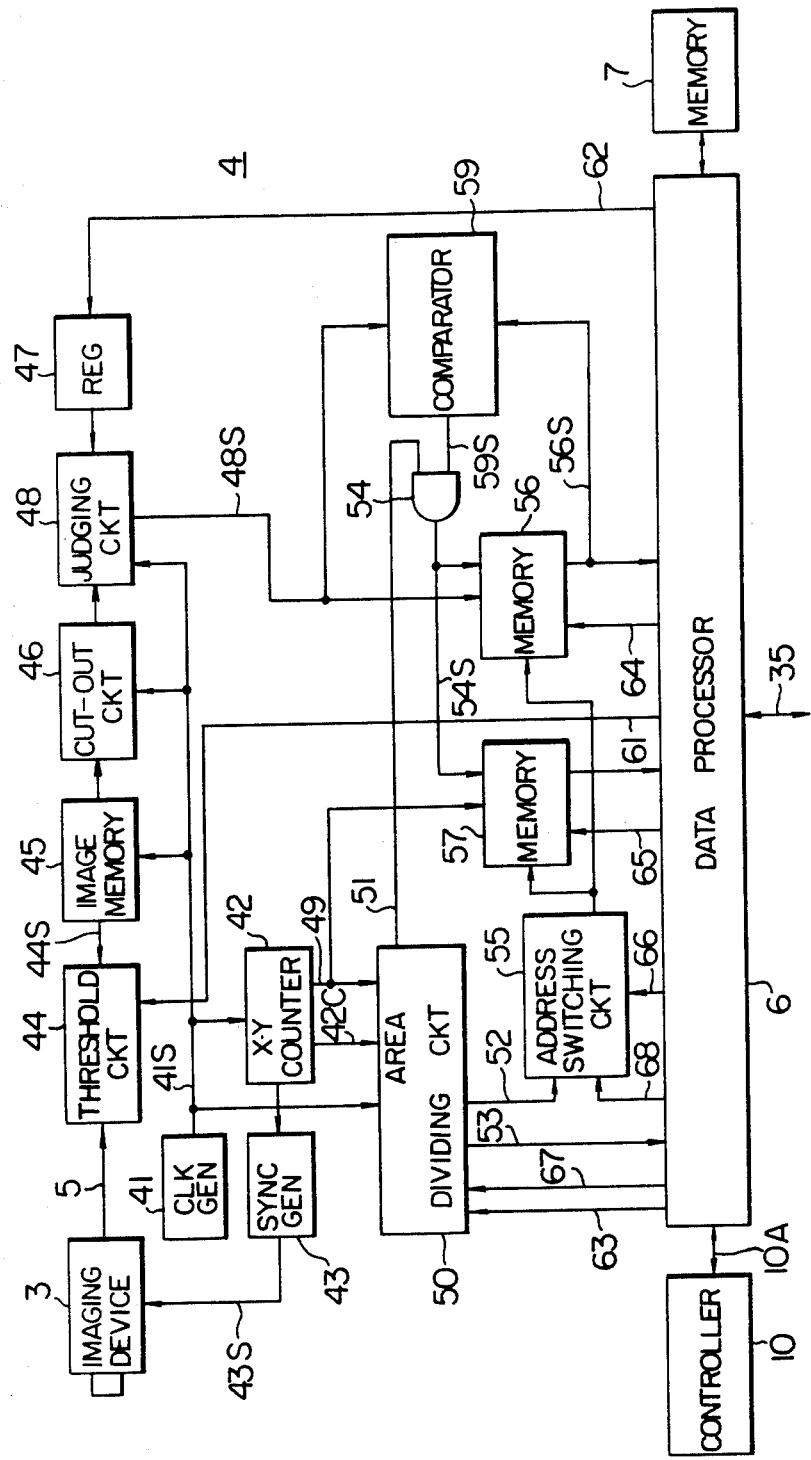
FIG. 9 is a block diagram for showing a detailed circuit configuration of the signal processing circuit 4 shown in FIG. 5.

FIG. 9 is a block diagram showing an example of a concrete circuit configuration on the signal processing circuit 4 shown in FIG. 5.

Referring to FIG. 9, a clock signal 41S provided by a clock generator 41 is applied to an X.Y-counter 42, which is made up of an X-counter (not shown) counting the clock signal 41S for obtaining an X-coordinate on the image plane of the imaging device 3, and a Y-counter (not shown) counting the carry signal of the X-counter for obtaining a Y-coordinate on the image surface. A synchronizing signal generator 43 generates a synchronizing signal 43S necessary to scan the image plane of the imaging device 3, on the basis of the contents of the X.Y-counter 42.

The image plane of the imaging device 3 is scanned in synchronizm with the synchronizing signal 43 to output the video signal 5. The video signal 5 is converted by a threshold circuit 44 into a binary signal 44S indicating whether an image on a picture element is "white" or "black". The binary signal is applied to an image memory 45.

The image memory 45 and a cut-out circuit 46 for cutting out a partial pattern may be of such types as disclosed in Japanese Patent Publication No.

14112/1971. That is, the image memory 45 is formed of (n-1) shift registers connected in series, to temporarily store therein binary video information on (n-1) scanning lines. The output signals of these shift registers and the binary signal 44S correspond to n picture elements arranged in a longitudinal direction on the image surface. Accordingly, when n signals corresponding to the above-mentioned n picture elements are taken out in parallel from the image memory 45 and supplied to the cut-out circuit 46, which is made up of n shift registers each having a length of n bits, to be outputted in the form of information having n×n bits, partial patterns each corresponding to a scanning point on the image surface and having n×n picture elements are successively taken out.

A register 47 is used to hold a reference pattern which is to be collated with the above-mentioned partial patterns and includes information on n×n picture elements, and stores therein the reference pattern read out of the memory device 7. The contents of the register 47 and the output of the cut-out circuit 46 are compared and collated with each other by a judging circuit 48 at every pair of corresponding bits, and the number of bits at the register 7 which have the same contents as corresponding bits at the output of the cut-out circuit 46, is outputted as a signal 48S indicating the degree of coincidence between the reference pattern and a partial pattern. Since the circuits 45, 46 and 48 are operated in synchronism with the clock signal 41S. The signals 48 indicating the degree of coincidence are successively outputted in synchronism with the scanning operation for successive picture elements on the image surface.

Figure 14:
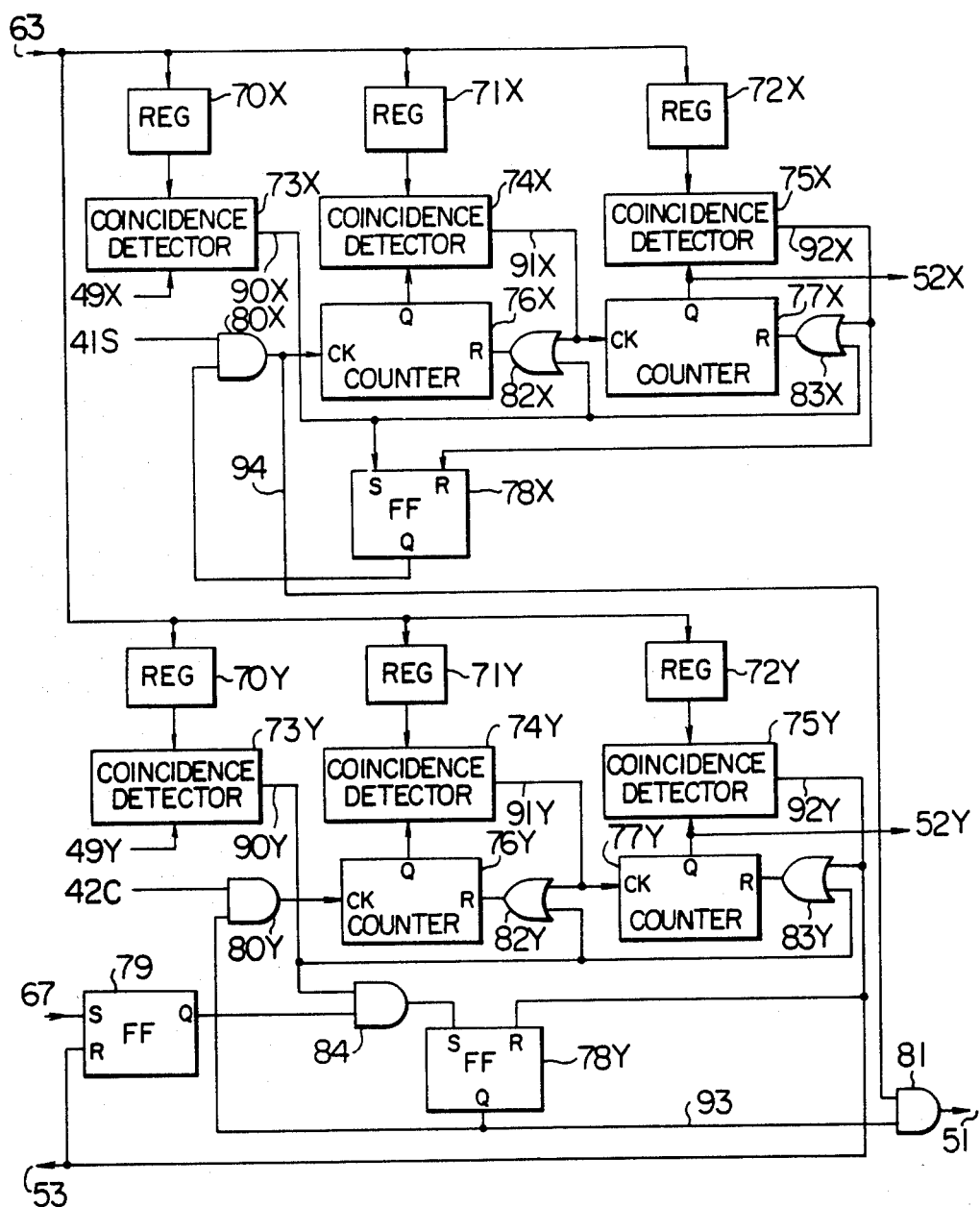
FIG. 14 is a block diagram showing a concrete circuit configuration of the area dividing circuit 50 shown in FIG. 9.

An area dividing circuit 50, which will be described later in detail with reference to FIG. 14, is operated in synchronism with the clock signal 41S, and judges whether the present scanning point lies in an effective image area, namely, the search area or not, on the basis of a carry signal 42C of the X-counter and a coordinate signal 49 (including an X-coordinate signal 49X and a Y-coordinate signal 49Y). These signals 42C and 49 are outputted from the X.Y-counter 42. When the scanning point lies in the search area, a signal 51 indicating the comparison of degree of coincidence is outputted. Further, the circuit 50 divides the search area into a plurality of sections, and generates an address signal 52 (including signals 52X and 52Y) indicating a section in which the present scanning point lies. The address signal 52 is supplied through an address switching circuit 55 to a memory 56 for storing therein the degree of coincidence and to a coordinate memory 57.

The memory 56 for storing the degree of coincidence has memory areas corresponding to the sections, to store the highest degree of coincidence among degrees of coincidence between partial patterns and the reference pattern within each section. The contents of the memory 56 are read out as a signal 56S in accordance with an address given from the address switching circuit 55, to be supplied to a comparator 59 together with the signal 48S (indicating the degree of coincidence) outputted from the judging circuit 48.

The comparator 59 delivers a pulse signal 59S when the newly obtained degree of coincident 48S is higher than the degree of coincidence 56S supplied from the memory 56. The pulse signal 59S is applied to an AND gate 54 which is made open by the signal 51 indicating the comparison degree of coincidence, and is outputted from the AND gate 54 only in a period during which the signal 51 is outputted, as a pulse signal 54S for indicating the renewal (namely, the update) of data in the memories 56 and 57. Accordingly, the memory 56 stores the new degree of coincidence given by the signal 48S at a memory area corresponding to the address signal 52, in response to the pulse signal 54S.

On the other hand, the coordinate memory 57 has coordinate storing areas respectively corresponding to the sections, in a manner similar to the memory 56, and stores coordinate data 49 outputted from the X.Y-counter 42 at a coordinate storing area addressed by the circuit 55 when the pulse signal 54S is supplied to the memory 57.

The scanning operation for the image plane is performed repeatedly in the X-direction while shifting the scanning point in the Y-direction. Accordingly, the address for indicating sections in the search area varies successively in accordance with the above-mentioned scanning operation. When the whole image surface has been scanned once, the highest degree of coincidence between partial patterns and the reference pattern and the coordinates of a partial pattern showing the highest degree of coincidence are obtained at every section, and are stored in the memories 56 and 57, respectively.

Figure 10:
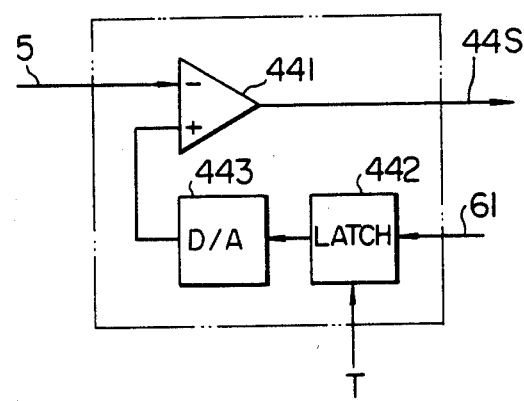
FIG. 10 is a block diagram showing a concrete circuit configuration of the threshold circuit 44 shown in FIG. 9.

FIG. 10 shows a detailed circuit configuration of the threshold circuit 44. Referring to FIG. 10, a video signal supplied from the imaging device 3 to an inverting input terminal of a comparator 441 is converted into a binary signal on the basis of a threshold voltage which is supplied from a digital-analog converter 443 to a non-inverting input terminal of the comparator 441. A latch circuit 442 latches threshold data 61, which is outputted from the data processor 6 in the form of a digital signal, in response to a timing signal T (namely, a read/write signal from the data processor 6) to send the threshold data to the digital-analog converter 443. In other words, the threshold circuit 44 converts the video signal into the binary signal on the basis of the threshold data 61 given by the data processor 6.

The data processor 6 may be a general purpose board computer, for example, a microcomputer in HMCS 6800 series which is manufactured by Hitachi Ltd. in Japan. When applied with a start signal 10A from a controller 10, the data processor 6 begins to control the operation of the signal processing circuit 4 in accordance with a previously programmed procedure such as shown in FIG. 11.

Figure 11:
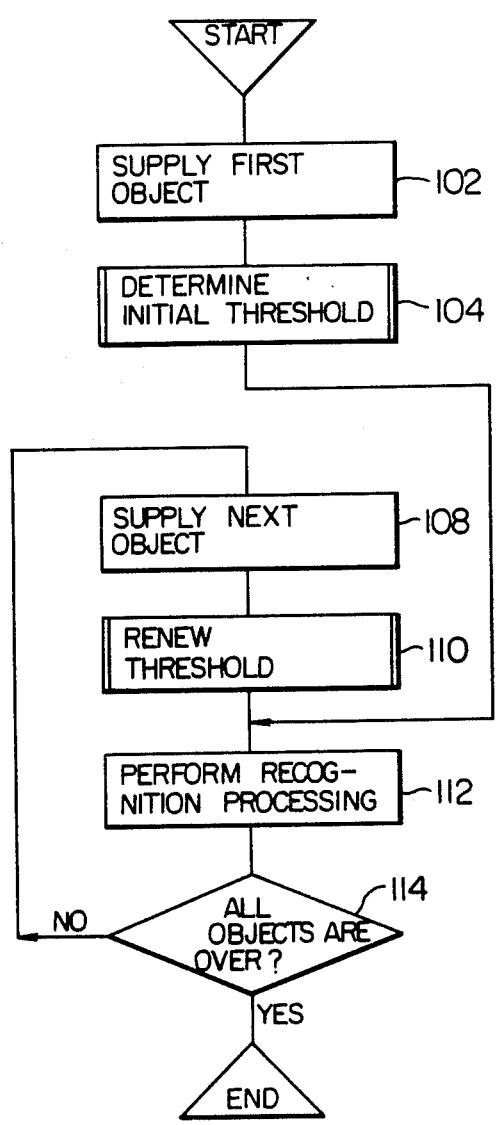
FIG. 11 is a flow chart for roughly showing a control procedure of the pattern recognition processing which is carried out in accordance with the present invention in the system shown in FIG. 5.

FIG. 11 shows an embodiment of the present invention, that is, a control procedure in the case where semiconductor pellets each of which is the object of recognition, are successively placed in the field of view of the imaging device, the position of each semiconductor pellet in the field of view is detected in accordance with the above-mentioned pattern recognition technique, and a bonding pad on each semiconductor pellet is connected to an external lead wire by the use of a wire bonding device (not shown). The procedure shown in FIG. 10 includes various routines which will be described below.

At first, the first object (namely, the first semiconductor pellet) is supplied in the field of view by a routine 102.

Next, a routine 104 for determining an initial threshold is executed which will be described below in detail with reference to FIGS. 9 and 12.

According to the present invention, the threshold for converting the video signal 5 into the binary signal can take a plurality of levels which are equally spaced with a pitch α between a lower limit THmin and an upper limit THmax, and each level of the threshold can be freely set in the threshold circuit 44. In a program for the routine for determining the initial threshold, the lower limit THmin in threshold data stored in the memory device 7 is first read out by a routine 122, and is outputted as the threshold data 61 to the threshold circuit 44. Incidentally, in a flow chart shown in FIG. 12, the threshold data 61 is expressed by TH as a variable data.

When the threshold data 61 has been outputted, a routine 124 is executed. That is, such matching parameters as dimensions $d_1$ and $d_2$ of each section in the X- and Y-directions (namely, the number of picture elements at each section in the X- and Y-direction), the number of sections $n_1$ and $n_2$ in the X- and Y-directions, and coordinates $X_s$ and $Y_s$ of a picture element indicating the starting point of a search area, are sent to the area dividing circuit 50 in the form of a signal 63.

When such processing has been completed, a pattern matching routine 126 is executed. In this routine, one of the reference patterns shown in FIGS. 7A to 7D is read out of the memory device 7 to be sent as a signal 62 to the register 47, clear signals 64 and 65 are supplied to the memory 56 for storing the degree of coincidence and the coordinate memory 57, respectively, to clear the contents of each of the memories 56 and 57, and then a switching signal 66 is applied to the address switching circuit 55 so that the circuit 55 can output an address supplied from the area dividing circuit 50. Further, a signal 67 indicating the start of pattern detecting operation is sent to the area dividing circuit 50. The area dividing circuit 50 applied with the signal 67 commences a pattern detecting operation at a time the scanning point returns to the initial position on the image plane of the imaging device 3. When the whole image plane has been scanned, the area dividing circuit 50 delivers a termination signal 53 to inform the data processor 6 of the termination of pattern detecting operation. As a result of the pattern matching operation, the degree of coincidence between partial patterns of a binary image obtained on the basis of the threshold TH and the reference pattern is obtained at every section, and these data are stored in the memory 56 for storing the degree of coincidence.

When supplied with the termination signal 53, the data processor 6 delivers the switching signal 66 by a routine 128 to place the address switching circuit 55 in such a state that the memories 56 and 57 can be accessed by an address signal 68 outputted from the data processor 6. In the data processor 6, the degree of coincidence at every section stored in the memory 56 is successively read out, and only those values of the degree of coincidence which exceed a predetermined value, are added up to calculate the total sum of the degree of coincidence. The above-mentioned total sum is equal to a value obtained by summing up the number of those picture elements in a partial pattern showing the highest degree of coincidence at each section which have the same state as corresponding picture elements in the reference pattern, for a plurality of sections each showing a high degree of coincidence.

When the total sum of the degree of coincidence has been calculated, a routine 130 is executed, that is, the above-mentioned threshold and the total sum of the degree of coincidence are stored in a predetermined memory area of the memory device 7. Thereafter, a judging routine 132 is executed. That is, it is judged whether the threshold TH exceeds the upper limit THmax or not. When the threshold TH does not exceed the upper limit, a routine 134 is executed to increase the threshold TH by one pitch $\alpha$. Then, the pattern matching routine 126 is again executed. Accordingly, the total sum of the degree of coincidence is calculated at each threshold until the threshold TH exceeds the upper limit THmax, and the total sum of the degree of coincidence and the threshold data are stored in the predetermined memory area of the memory device 7. In the case where the threshold TH exceeds the upper limit, a routine 136 is executed after the judging routine 132. In the routine 136, the highest value is selected from values indicating the total sum of the degree of coincidence for various values of threshold, and a value of threshold corresponding to the total sum of the degree of coincidence having the highest value is outputted as an optimum threshold $TH_o$. Thus, the routine 104 terminates.

In a routine 112, the video signal is converted into the binary signal on the basis of the above-mentioned optimum threshold, the position of the object is detected by using the reference pattern, and the position of the bonding pad is calculated from the detected position of the object to perform a predetermined bonding operation by the use of the wire bonding device. Accordingly, in the routine 112, after the matching parameters have been set in the same manner as in the routine 124, the reference patterns a to d shown in FIGS. 7A to 7D are read out of the memory device 7 at four consecutive frames, and the same pattern matching operation as in the routine 126 is performed repeatedly. In this case, each time the pattern matching operation for one reference pattern has been completed, the switching sign 66 is delivered. That is, data with respect to each section are read out of the memory 56, and coordinate data corresponding to sections which show the degree of coincidence exceeding a predetermined value, are read out of the coordinate memory 57 to be stored in a specified area of the memory device 7. Thus, the positions of all of those partial patterns in the search area which coincide with the reference patterns a to d are stored in the memory device 7, and the position of the object can be detected by comparing these positions with the previously stored position data of the pattern shown in FIG. 8. When the actual position of the object in the field of view of the imaging device is detected, the position where the bonding operation is performed by the bonding device can be corrected by calculation. Accordingly, when data for correcting the bonding position are outputted as a signal 35 shown in FIG. 9, the data processor 6 can perform a sequential control for bonding operation.

In this routine, it is judged whether all of the objects have been supplied in the field of view or not. When all of the objects are not supplied in the field of view, a routine 108 is executed. When all of the objects have been supplied, the whole operation terminates.

The next object is supplied in the field of view. Then, a routine 110 is executed.

Figure 12:
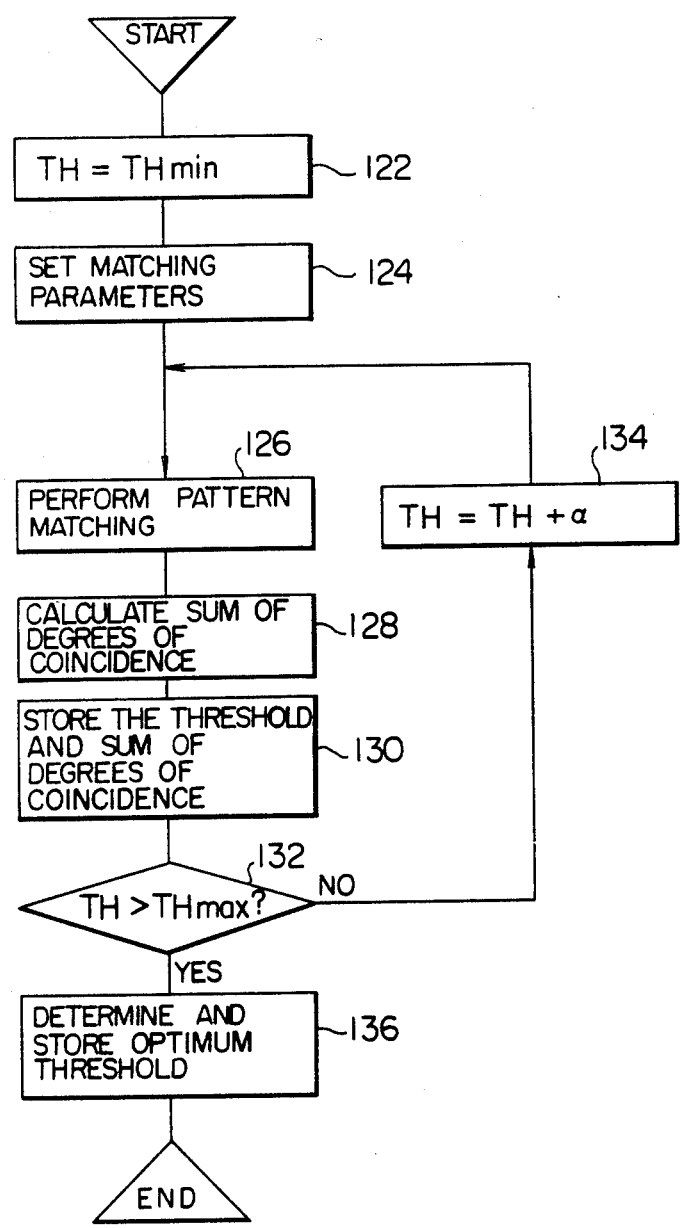
FIG. 12 is a flow chart for explaining in detail the routine 104 shown in FIG. 11 for determining an initial threshold.
Figure 13:
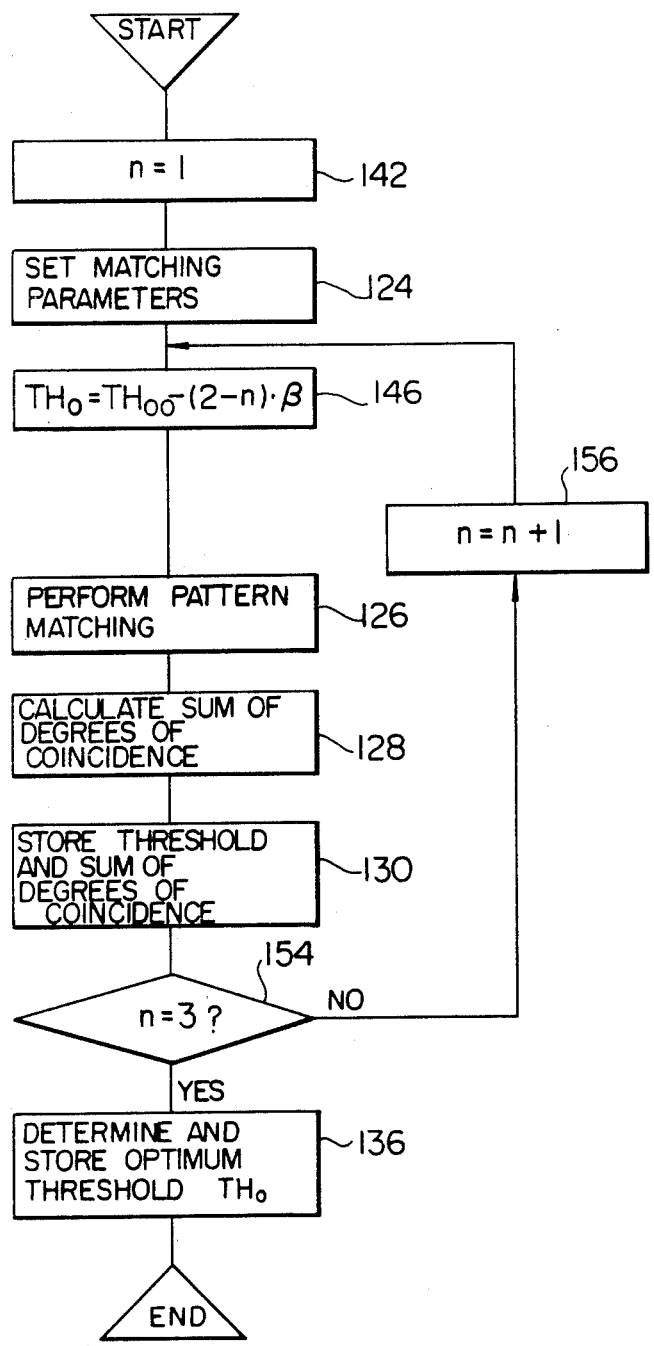
FIG. 13 is a flow chart for explaining in detail the routine 110 shown in FIG. 11 for renewing a threshold.

FIG. 13 shows a concrete chart of the routine 110 for renewing the threshold. Referring to FIG. 13, a variable n indicating how many times the threshold has been renewed is set 1 (one) in a routine 142. Next, the routine 124 shown in FIG. 12 for setting the matching parameters is executed. Then, a routine 146 is executed to supply to the threshold circuit 44 a threshold $TH_o$ given by the following equation:

$$TH_o = TH_{oo} - (231\ n)\beta \qquad (1)$$

where $TH_{oo}$ indicates a previously obtained optimum threshold. In more detail, the symbol $TH_{oo}$ is the optimum threshold which was used in the recognition processing for the object antecedent to the present object. That is, in the state where the second object is supplied in the field of view, the symbol $TH_{oo}$ is a value which was obtained by the initial threshold determining routine 104 for the first object. Further, a character $\beta$ appearing on the right side of equation (1) indicates a pitch in renewing the threshold for converting the video signal into the binary signal. The pitch $\beta$ may be equal to the previously-mentioned pitch $\alpha$. When n is equal to 1(one), the threshold $TH_o$ supplied to the threshold circuit 44 is smaller than the initial optimum threshold $TH_{oo}$ by the pitch $\beta$.

When the routine 146 has been executed, the routines 126, 128 and 130 shown in FIG. 12 are executed. In more detail, the pattern mathcing routine 126, the routine 128 for calculating the total sum of the degree of coincidence, and the routine 130 for storing the threshold and the total sum of the degree of coincidence are executed. When the routine 130 has been completed, it is judged in a judging routine 154 whether n is equal to (three) or not. When n is equal to 1 or 2, a routine 156 is executed, that is, the value of n is increased by one, and then the routines 146, 126, 128 and 130 are again executed. As a result, the degree of coincidence between the binary image and a reference pattern is detected for three values of threshold $TH_{oo}-\beta$, $TH_{oo}$ and $TH_{oo}+\beta$, and the total sum of the degree of coincidence for each value of threshold and each value of threshold are stored in a predetermined area of the memory device 7. When it is judged in the judging routine 154 that n is equal to 3, the routine 136 shown in FIG. 12 for determining and storing the optimum threshold is executed. That is, the highest value is selected from three values which indicate the total sum of the degree of coincidence and are stored in the memory device, and a value of threshold $TH_{oo}-\beta$, $TH_{oo}$, or $TH_{oo}+\beta$ corresponding to the above-mentioned highest value is selected as the optimum threshold, which is supplied to the threshold circuit 44. Thereafter, the previously-mentioned routine 114 is executed. That is, the routines 108, 110 and 112 are executed repeatedly until the processing for all of the objects has been completed.

As is evident from the foregoing explanation, the threshold for causing the binary image to match best with a reference pattern can be determined in the routines 104 and 110 shown in FIG. 11, and the position of an object can be detected with satisfactory accuracy in the routine 112 for performing recognition processing, by converting the video signal into a binary signal on the basis of the above-mentioned threshold.

Next, a concrete circuit configuration of the area dividing circuit 50 will be explained with reference to FIG. 14.

The area dividing circuit shown in FIG. 14 is made up of an X-address control part and a Y-address control part. In FIG. 14, reference numerals 70X and 70Y designate registers for holding coordinates $X_s$ and $Y_s$ of a starting point of a search area, 71X and 71Y registers for holding dimensions $d_2$ and $d_1$ of one section in the X- and Y-directions, 72X and 72Y registers for holding the number of sections $n_2$ and $n_1$ in the X- and Y-directions, 73X, 73Y, 74X, 74Y, 75X and 75Y coincidence detectors, 76X, 76Y, 77X and 77Y counters, 78X, 78Y and 79 flip-flops, 80X, 80Y, 81 and 84 AND gates, and 82X, 82Y, 83X and 83Y OR gates. The parameters $X_s$, $Y_s$, $d_2$, $d_1$, $n_2$ and $n_1$ are supplied from the data processor 6 in the form of the signal 63.

The operation of the X-address control part will first be explained. The coincidence detector 73X compares an X-coordinate 49X of the scanning point outputted from the X.Y-counter 42 with the coordinate $X_s$ of the starting point of the search area held in the register 70X, and delivers a pulse signal 90X when the coordinate 49X coincides with the coordinate $X_s$. The pulse signal 90X sets the flip-flop 78X, and is supplied to the counters 76X and 77Y through the OR gates 82X and 83X to reset the contents of each of these counters to zero. When the flip-flop 78X is set, the AND gate 80X is made open by the output of the flip-flop 78X. Therefore, the clock signal 41S is supplied to the counter 78X, and the counting operation is started therein.

The coincidence detector 74X delivers a pulse signal 91X when the contents of the counter 76X coincide with the width $d_2$ of one section held in the register 71X. The pulse signal 91X is supplied to the counter 77X to increase the contents thereof by one, and is further supplied to the reset terminal of the counter 76X through the OR gate 82X. Accordingly, the counter 76X starts a new counting operation each time the contents thereof reach the width $d_2$ of one section, and the contents of the counter 77X are increased by one each time the scanning point is moved from a section to the next section in the X-direction. Further, the contents of the counter 77X indicate a number (in the X-direction) of a section which is now subjected to scanning, and are delivered as a signal 52X indicating the X-address of the section.

The coincidence detector 75X compares the contents of the counter 77X with the number $n_2$ of sections in the X-direction which is held in the register 72X, and delivers a pulse signal 92X when the contents of the counter 77X coincide with the number $n_2$ of sections. The pulse signal 92X is applied through the OR gate 83X to the reset terminal of the counter 77X to restore the contents thereof to zero, and further resets the flip-flop 78X. Thus, the AND gate 80X is closed, and it is prevented to supply the clock signal 41S to the counter 76X. These operations are performed at every horizontal scanning line, and therefore the signal 52X indicating the X-address of a section in the search area is delivered repeatedly.

Next, the Y-address control part will be explained. Referring to the lower part of FIG. 14, when the signal 67 indicating the start of detecting operation is outputted from the data processor 6, the flip-flop 79 is set, and the AND gate 84 is made open. The coincidence detector 73Y compares a Y-coordinate 49Y of the scanning point outputted from the X.Y-counter 42 with the coordinate $Y_s$ of the starting point of the search area held in the register 70Y, and delivers a pulse signal 90Y when the Y-coordinate 49Y coincides with the coordinate $Y_s$. The pulse signal 90Y is applied to the counters 76Y and 77Y through the OR gates 82Y and 83Y to reset these counters. Further, the pulse signal 90Y is applied through the AND gate 84 to the flip-flop 78Y when the AND gate 84 is kept open, to set the flip-flop 78Y, and thus the AND gate 80Y is made open. Therefore, the carry signal 42C outputted from the X.Y-counter 42 at intervals of one horizontal scanning line is supplied to the counter 76Y, and the counting operation is started therein.

The coincidence detctor 76Y delivers a pulse signal 91Y when the contents of the counter 76Y coincide with the length $d_1$ (in the longitudinal direction) of one section held in the register 71Y. The pulse signal 91Y is applied to the counter 77Y to increase the contents thereof by one, and is further applied through the OR gate 82Y to the reset terminal of the counter 76Y to reset the contents thereof. Accordingly, the counter 76Y commences a new counting operation each time the contents thereof reach the length $d_1$ of one section, and the contents of the counter 77Y are increased by one each time the scanning point is moved from a section to the next section in the Y-direction. The contents of the counter 77Y indicate a number (in the Y-direction) of a section which is now subjected to scanning, and are delivered as a signal 52Y indicating the Y-address of the section. The signals 52X and 52Y are supplied to the memory 56 for storing the degree of coincidence, and to the coordinate memory 57.

The coincidence detector 75Y compares the contents of the counter 77Y with the number $n_1$ of sections in the Y-direction which is held in the register 72Y, and delivers a pulse signal 92Y when the contents of the counter 77Y coincide with the number $n_1$ of sections. The pulse signal 92Y is applied to the counter 77Y through the OR gate 83Y to reset the counter 77Y, and simultaneously applied to the flip-flops 78Y and 79 to reset these flip-flops. Further, the pulse signal 92Y is sent to the data processor 6 as the signal 53 indicating the termination of a specified pattern detection processing.

The flip-flop 78Y is kept open during one scanning period for the search area, and therefore the signal 51 indicating the comparison between two kinds of the degree of coincidence is outputted from the AND gate 81 which is applied with an output signal 93 of the flip-flop 78Y and an output signal 94 of the AND gate 80X in the X-address control part.

In the above-mentioned embodiment, the optimum threshold is selected for on reference pattern, and a binary image obtained on the basis of the above-mentioned optimum threshold is used in common in the pattern recognition processing using a plurality of reference patterns. However, this may be replaced by a manner that the optimum threshold has been detected for each of a plurality of reference patterns in the routine 104 for determining the initial threshold or in the routine 110 for renewing the threshold, and the threshold for obtaining the binary image is changed in the routine 112 for performing recognition processing each time the reference pattern is changed.

Further, in the above-mentioned embodiment, various parameters supplied to the area dividing circuit 50 for determining the threshold are the same as parameters used in normal processing for pattern recognition. However, it is not always required to use the same parameters. The determination of the threshold may be made in an area which is smaller than a normal pattern search area, or may be made in an enlarged area. Each of sections making up a search area may have any size. In an extreme case, the dimensions $d_1$ and $d_2$ of one section in the Y- and X-directions may be equal to 1 (one). In this case, values of the degree of coincidence between a reference pattern and partial patterns each cut out at one picture element are added up.

The overall degree of coincidence may be the total sum of the degree of coincidence between a reference pattern and each partial pattern, or may be a value obtained by summing up the highest one selected from values indicating the degree of coincidence between a reference pattern and partial patterns in one section, for a plurality of sections.

According to the present invention, a characteristic shape which exists in an image of an object at one or a plurality of positions, is previously stored as a reference pattern, and the threshold for converting the image into a binary image in pattern recognition processing is determined on the basis of the highest value of the overall degree of coincidence between the reference pattern and partial patterns which are obtained at a plurality of positions where the characteristic shape is present. The threshold thus determined can always provide an optimum threshold for a pattern matching operation between the reference pattern and the binary image, in spite of variations in respective characteristics of an illumination system, an imaging system and others. Accordingly, the present invention is very effective in a pattern recognition system in which position detection must be made with strict accuracy

What is claimed is:

1. A method of determining an optimum threshold for converting a video signal of an object into a binary signal, suitable for use in a process for recognizing a pattern on said object, comprising the steps of:

storing a pattern expected to exist at one or more positions on a surface of an object as a reference pattern;

converting a video signal of an object into a binary image signal on the basis of each of different values of threshold;

cutting a plurality of partial patterns out of a predetermined region of said binary image signal corresponding to each value of threshold;

detecting the degrees of coincidence each between each of said partial patterns and said reference pattern; and selecting from said different values of threshold a value of threshold for making highest the overall degree of coincidence between said plurality of partial patterns and said reference pattern, on the basis of aid degrees of coincidence detected at each value of threshold, wherein an image of said object is divided into a plurality of sections, the highest value of the degrees of coincidence is selected among the degrees of coincidence between a partial pattern and said reference pattern which are obtained for a plurality of partial patterns included in one section, at all of said sections, and the total sum of the highest values of the degrees of coincidence at all of said sections is used as said overall degree of coincidence.

2. A method of determining an optimum threshold according to claim 1, wherein those ones of said highest values of the degrees of coincidence at all of said sections which exceed a predetermined value, are summed up to obtain said overall degree of coincidence.

3. A method of determining an optimum threshold according to claim 1 or 2, wherein the degree of coincidence is detected only for partial patterns cut out of a limited area of said image.

4. A method of determining an optimum threshold according to claim 1 or 2, wherein said different values of threshold are selected from a predetermined range which includes, as a reference value, an optimum threshold used in the pattern recognition processing for a preceding object.

5. A method of determining an optimum threshold according to claim 4, wherein said different values of threshold are varied stepwise in said predetermined range.

6. A method of determining an optimum threshold according to claim 3, wherein said different values of threshold are selected from a predetermined range which includes, as a reference value, an optimum threshold used in the pattern recognition processing for a preceding object.

7. A method of determining an optimum threshold according to claim 6, wherein said different values of threshold are varied stepwise in said predetermined range.

8. A method of determining an optimum threshold for converting a video signal of an object into a binary signal, suitable for use in a process for recognizing a pattern on the object, comprising the steps of:
   storing a pattern expected to exist at one or more positions on a surface of an object as a binary reference pattern signal;
   converting a video signal of the object into a series of binary image signals each on the basis of a different threshold value;
   extracting each binary image signal of a plurality of signals corresponding to respective partial patterns lying within a predetermined region of the pattern;
   comparing each partial pattern signal and the reference pattern signal to detect the degree of coincidence therebetween; and
   selecting from said different threshold values, one threshold value for making highest the overall degree of coincidence between said plurality of partial pattern signals and said reference pattern signal.

9. A method of determining an optimum threshold according to claim 8, wherein an image of the object is divided into a plurality of sections, the highest value of the degrees of coincidence is selected among the degrees of coincidence between partial patterns and said reference pattern which are obtained for a plurality of partial patterns included in one section, at each of said sections, and the total sum of the highest values of the degrees of coincidence at each of said sections is used as said overall degree of coincidence.

10. A method of determining an optimum threshold according to claim 9, wherein among said highest values of the degrees of coincidence at all of said sections, those which exceed a predetermined value are summed up to obtain said overall degree of coincidence.

11. A method of determining an optimum threshold according to claim 9 or 10, wherein the degree of coincidence is detected only for partial patterns cut out of a limited area of said image.

12. A method of determining an optimum threshold according to claim 8, 9 or 10, wherein said different threshold values are selected from values existing in a predetermined range which is centered on an optimum threshold value found for a preceding object.

13. A method of determining an optimum threshold according to claim 12, wherein said different values of threshold are varied stepwise in said predetermined range.

14. A method of determining an optimum threshold according to claim 11, wherein said different threshold values are selected from values existing a predetermined range which is centered on an optimum threshold value found for a preceding object.

15. A method of determining an optimum threshold according to claim 14, wherein said different values of threshold are varied stepwise in said predetermined range.

* * * * *